Figure 1:
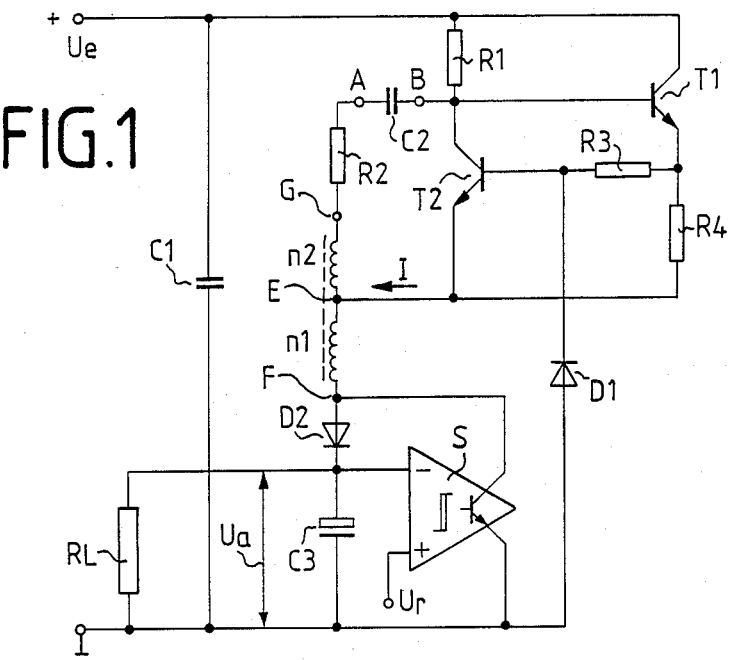

United States Patent [19]

Bergk

[11] Patent Number: 4,875,001

[45] Date of Patent: Oct. 17, 1989

[54] ELECTRONIC SWITCHING POWER SUPPLY WITH A CHOKE CONVERTER

[75] Inventor: Günther Bergk, Niedernhausen, Fed. Rep. of Germany

[73] Assignee: Braun Aktiengesellschaft, Kronberg, Fed. Rep. of Germany

[21] Appl. No.: 281,487

[22] Filed: Dec. 8, 1988

[30] Foreign Application Priority Data

Dec. 16, 1987 [DE] Fed. Rep. of Germany ....... 3742613

[51] Int. Cl.$^4$ .......................................... H02M 3/158
[52] U.S. Cl. .................................. 323/223; 323/271; 323/284; 323/287; 323/290
[58] Field of Search ............... 323/220, 223, 224, 225, 323/271, 284, 290, 285, 286, 287; 363/89

[56] References Cited

U.S. PATENT DOCUMENTS

| 3,553,568 | 1/1971 | Saba | 323/285 |
| 4,258,309 | 3/1981 | Ohsaka et al. | 323/271 |
| 4,546,304 | 10/1985 | Schwarz | 323/287 |
| 4,647,833 | 3/1987 | Schmidt et al. | 323/284 |
| 4,694,240 | 9/1987 | Grunsch | 323/290 |

FOREIGN PATENT DOCUMENTS 226253 6/1987 European Pat. Off. .
2323482 11/1974 Fed. Rep. of Germany ...... 323/271

Primary Examiner—William H. Beha, Jr.
Attorney, Agent, or Firm—Fish & Richardson

[57] ABSTRACT

The variation of the time (t2) in which current flows from the chock (n1) of the switching power supply to the load (C3, RL), which variation is necessary for the regulation of the output voltage (Ua), is accomplished by means of a threshold switch (S) short-circuiting the coil of the choke.

5 Claims, 2 Drawing Sheets

ELECTRONIC SWITCHING POWER SUPPLY WITH A CHOKE CONVERTER

This invention relates to a circuitry for regulating the output voltage of an electronic switching power supply supplying power to an electrical load connected in parallel with an output capacitor from a dc voltage source of varying voltage level, including a choke converter having the circuit of a first transistor connected in series with a choke, with the choke being charged with a rising current in the conductive state of the first transistor while in its off-state the energy stored in the choke flows through a diode to the output capacitor which discharges through the electrical load, with an emitter resistor which is connected in series with the first transistor and in parallel with the base-emitter circuit of a second transistor whose collector is connected to the base of the first transistor, and with a feedback coil magnetically coupled to the choke, with the feedback coil having its one end connected to the base of the first transistor through a current-limiting resistor and a feedback capacitor connected in series, while its other end is connected to the junction of the choke and the emitter resistor.

Electronic switching power supplies are used for delivering a constant voltage and/or a constant current to electrical or electronic devices, being constructed as choke converters, primary or secondary switched-mode blocking-oscillator type converters or forward converters or as push-pull converters. As a rule, they include a rectifier circuit with a subsequent filtering and smoothing arrangement to which a transformer or a choke is connected. Where a choke converter is utilized, an electronic switch or switching transistor is provided which is connected in series with the choke and the electrical load and turns ON and OFF in dependence upon one or several control variables, with the energy stored in the choke being delivered to the electrical load through a diode of suitable polarity during the off-period of the electronic switch.

A circuitry of the type initially referred to is known from German patent specification DE-PS No. 3,310,678. In this patent specification, an electrolytic capacitor 10 is used, among others, for regulating the output voltage. For reasons of space and reliability, however, the aim is to avoid, where possible, the use of electrolytic capacitors in circuitries. In addition, in the known circuitry the diode 8 is required to have a relatively high dielectric strength.

It is, therefore, an object of the present invention to devise a circuitry which dispenses with the components referred to above without involving major expenditure in terms of components or cost.

This requirement is satisfied in a circuitry of the type initially identified in that the variation of time necessary for the regulation of the output voltage, during which time current flows from the choke to the output capacitor, is accomplished by means of a threshold switch short-circuiting the choke coil.

The circuitry of the invention is suitable for dc voltages and—with a series rectifier connected—for ac voltages of any frequency. It produces a constant output voltage from all voltages occurring in electrical power systems including their fluctuations which are, for example, between 70 and 260 volts. The electrical load may be, for example, the dc motor of a small domestic appliance as, for instance, an electric shaver, and/or an accumulator.

In an advantageous embodiment, the circuitry is configured such that the energy stored in the choke flows through the base-emitter circuit of the second transistor. Hence, during the entire discharge period of the choke, the base-emitter circuit of the first transistor is short-circuited, thereby ensuring that the first transistor remains nonconducting.

If also the current flowing during the short-circuiting of the choke coil is passed through the base-emitter circuit of the second transistor, the first transistor remains reliably OFF also during this period.

Further advantageous embodiments will become apparent from the other claims.

Figure 2:
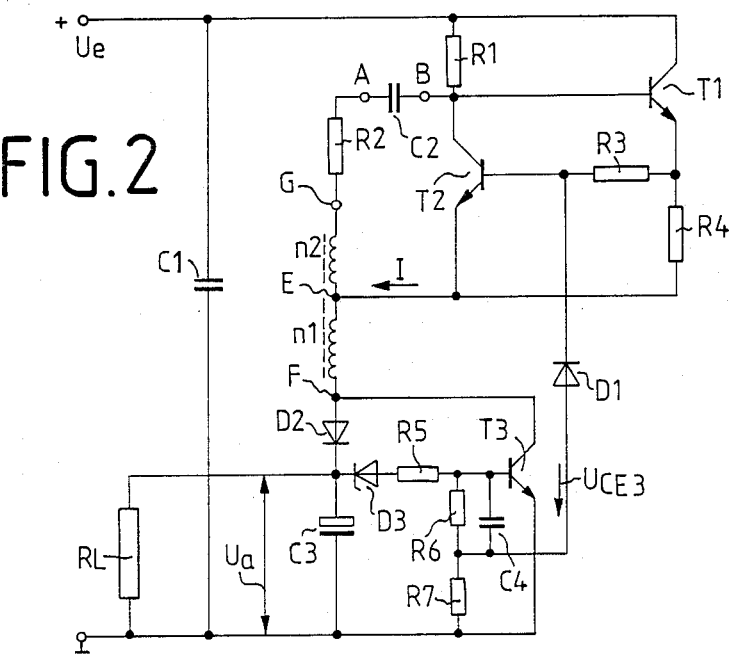
Figure 3:
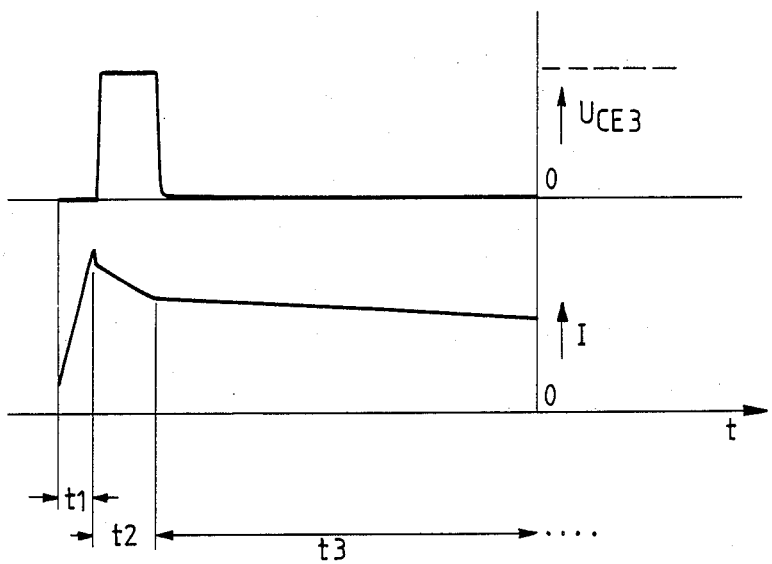
Figure 4:
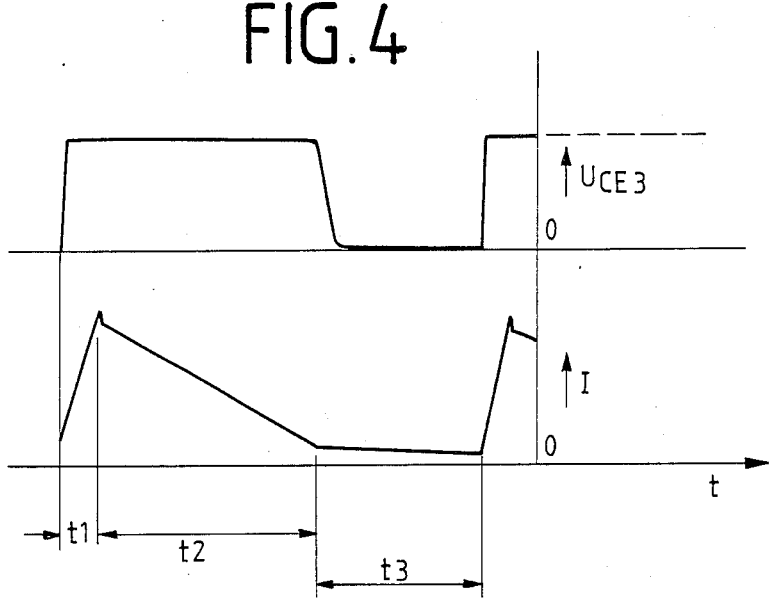

The invention will be described in the following in more detail with reference to the embodiments illustrated in the drawings. In the drawings, FIG. 1 is a circuit diagram of an electronic switching power supply in which both the discharge current and the short-circuit current of the choke flow through the base-emitter circuit of the second transistor;

FIG. 2 is an embodiment of a threshold switch in a circuitry according to FIG. 1; and FIGS. 3 and 4 are graphical representations of voltages and currents in the circuitry of FIG. 2, in FIG. 3 under no-load conditions and in FIG. 4 under partial-load conditions.

Referring now to FIG. 1, the series circuit comprising a first transistor T1, an emitter resistor R4, a choke n1, a decoupling diode D2 and an output capacitor C3 connected in parallel with a load resistor RL is connected between the two terminals of a dc voltage source Ue. The output voltage Ua is applied to the parallel circuit comprising the load resistor RL and the output capacitor C3. The two terminals of the dc voltage source Ue are bridged by a filter capacitor C1 in order to smooth out the input voltage Ue which, for instance, may be the sinusoidal rectified voltage of a rectifier connected to an ac line. Connected between the collector of transistor T1, which is connected to the positive terminal of the input voltage Ue, and the junction of the emitter resistor R4 and the choke n1 (node E) is the series circuit formed by an input resistor R1 and the circuit of a second transistor T2 whose base is connected to the emitter of transistor T1 through a base resistor R3. The base of transistor T1, in addition to being connected to the junction of the collector of transistor T2 and the input resistor R1, is further connected, through a feedback capacitor C2 and a current-limiting resistor R2, to a feedback coil n2 having its other end connected to node E. The coil of choke n1 and the feedback coil n2 are magnetically coupled and have the same sense of winding. The negative terminal of the input voltage Ue which in this embodiment represents the reference potential is connected to the base of transistor T2 through a diode D1. The junction F of the choke n1 and the decoupling diode D2 is connected to reference potential through the circuit path of a threshold switch S. The threshold switch S is controlled by the difference between the output voltage Ua and a reference voltage Ur.

When the input voltage Ue is applied, transistor T1 receives a low base current through input resistor R1. The emitter current amplified by the current amplification factor of transistor T1 flows through the emitter resistor R4, the choke n1, the decoupling diode D2 and the output capacitor C3 or the load resistor RL to reference potential. The load resistor RL may be a dc motor, for example. This primary current I1 induces in the feedback coil n2 a voltage which very rapidly renders transistor T1 conducting up to saturation through the current-limiting resistor R2 and the feedback capacitor C2.

When the voltage drop across the emitter resistor R4 reaches the threshold value of the base-emitter circuit of transistor T2 as a result of the linearly rising primary current I1, transistor T2 is turned ON through the base resistor R3. This causes transistor T1 to be turned OFF instantly because the base-emitter circuit of transistor T1 becomes short-circuited. Simultaneously, the feedback capacitor C2 is discharged and subsequently reverse-charged, because with transistor T1 cut off the voltage induced in the feedback coil n2 is subjected to an abrupt polarity reversal.

During the ON period of transistor T1, a voltage developed in choke n1 whose potential across node E was positive with respect to the potential across node F. After cutoff of transistor T1, that is, with the delivery of current I to choke n1 decreasing, the voltage residing at choke n1 reverses abruptly, causing node F to be positive with respect to node E. The energy stored in choke n1 then flows in the form of a secondary current I2 through decoupling diode D2, output capacitor C3, diode D1 and the base-emitter circuit of transistor T2 to node E. This secondary current I2 flowing through the base-emitter circuit of transistor T2 has the advantage of maintaining the base-emitter circuit of transistor T1 short-circuited during the entire discharge period of the choke and of reverse-charging the feedback capacitor C2, following which node B at the right-hand electrode has a positive voltage with respect to node A at the left-hand electrode. As a result, transistor is turned ON again instantly after secondary current has stopped flowing.

With the output voltage Ua having reached its nominal value, threshold switch S is turned ON, connecting the lower end of the coil of choke n1 (node F) through diode D1 and the base-emitter circuit of transistor T2 to the upper end of the coil of choke n1 (node E). The coil of choke n1 is thus short-circuited through two diode circuit paths, that is, diode D1 and the base-emitter diode of transistor T2. Applying to the coil of the choke n1 a voltage which is substantially lower than the output voltage Ua extends the discharge on-period considerably, because the energy stored in choke n1 is only consumed by the losses occurring in the closed circuit.

FIG. 2 illustrates a simple embodiment of the threshold switch S of FIG. 1. Components in FIG. 2 which are identical with those of FIG. 1 are assigned like reference numerals. In this embodiment, the threshold switch S is a third transistor T3 whose circuit is placed between the node F at the load-side end of the choke n1 and reference potential. Its base is connected through a decoupling resistor R5 and a zener diode D3 to the positive end of the output capacitor C3 or the load resistor RL and, on the other hand, to reference potential through a voltage divider comprised of resistors R6 and R7. In this embodiment, the anode end of diode D1 is connected to the junction of the two resistors R6 and R7 instead of to reference potential as in FIG. 1. Connected in parallel to resistor R6 is a capacitor C4 to make this connection dynamically low resistance. If the output voltage Ua exceeds its nominal value, zener diode D3 becomes conducting, turning transistor T3 ON. The decoupling diode D2 prevents output capacitor C3 from discharging through the circuit of transistor T3 while transistor T3 is conducting.

Both the secondary current I2 flowing in resistor R7 and the short-circuit current I3 produce across this resistor a voltage drop of small magnitude proportional to the current, with the junction of resistors R6 and R7 being negative with respect to reference potential. Through resistor R6 and parallel-connected capacitor C4, this results in an increase in the positive voltage at the base of transistor T3, representing a positive feedback.

FIGS. 3 and 4 show the collector-emitter voltage $U_{CE3}$ of transistor T3 and the current I flowing in node E in various phases. FIG. 3 shows these characteristic curves at no-load while FIG. 4 shows them at partial load. In the Figures, t1 is the period of time in which primary current I1 enters the choke n1, that is, T1 conducts. During period t2, secondary current I2 flows from choke n1 through diode D1 and the base-emitter circuit of transistor T2 to the load, that is, to the output capacitor C3 and the load resistor RL. During this period t2, both transistor T1 and transistor T3 are non-conducting. During period t3, transistor T3 conducts, and current flows only in choke n1 through the circuit of transistor T3, diode D1 and the base-emitter circuit of transistor T2. The minor drop in short-circuit current which occurs during period t3 is attributable to losses in choke n1, in the base-emitter diode of transistor T2 and in diode D1.

As a comparison of the characteristics of FIGS. 3 and 4 shows, period t2 in which secondary current I2 flows from choke n1 to the load is substantially shorter at no load than at partial load. The period t3 during which the coil of choke n1 is short-circuited is correspondingly longer at no load than at partial load. Hence, the variation of time t2 necessary for regulating the output voltage Ua is accomplished by short-circuiting the coil n1.

In an embodiment, the output voltage Ua is 40 volts, and the load resistor RL is a dc motor with a power of about 5 watts. The oscillation frequency of the choke converter is in the range of between 30 and 50 kHz and the frequency of the intervals, that is, when transistor T3 or the threshold switch S is On, varies in dependence on the load.

I claim:

1. A circuitry for regulating the output voltage (Ua) of an electronic switching power supply supplying power to an electrical load (RL) connected in parallel with an output capacitor (C3) from a dc voltage source (Ue) of varying voltage level, including a choke converter having the circuit of a first transistor (T1) connected in series with a choke (n1), said choke (n1) being charged with a rising current in the conductive state of said first transistor while in its off-state the energy stored in said choke (n1) flows through a diode (D1) to said output capacitor (C3) which discharges through said electrical load (RL), with an emitter resistor (R4) which is connected in series with said first transistor (T1) and in parallel with the base-emitter circuit of a second transistor (T2) having its collector connected to the base of said first transistor (T1), and with a feedback coil (n2) magnetically coupled to said choke (n1), said feedback coil (n2) having its one end connected to the base of said first transistor (T1) through a current-limiting resistor (R2) and a feedback capacitor (C2) connected in series, while its other end is connected to the junction of the choke (n1) and the emitter resistor (R4), characterized in that the variation of time (t2) necessary for the regulation of the output voltage (Ua), during which time current flows from said choke (n1) to said output capacitor (C3), is accomplished by means of a threshold switch (S) short-circuiting the coil of said choke (n1).

2. A circuitry as claimed in claim 1, characterized in that the energy stored in said choke (n1) flows through the base-emitter circuit of said second transistor (T2) to said output capacitor (C3).

3. A circuitry as claimed in claim 1, characterized in that said threshold switch (S) short-circuits the coil of said choke (n1) through said diode (D1) and the base-emitter circuit of said second transistor, and that a decoupling diode (D2) is inserted between the node (F) of said threshold switch (S) at the load end of said choke (n1) and said output capacitor (C3).

4. A circuitry as claimed in claim 3, characterized in that said threshold switch (S) is a third transistor (T3) whose circuit is provided between said node (F) at the load end of said choke (n1) and reference potential, and whose base is connected to said output capacitor (C3) through a decoupling resistor (R5) and a zener diode (D3) and, on the other hand, to reference potential through a resistor (R6, R7).

5. A circuitry as claimed in claim 4, characterized in that said resistor is comprised of a voltage divider (R6, R7) having diode (D1) connected to its node, with resistor (R6) which is connected to the base having a capacitor (C4) connected in parallel thereto.

* * * * *